United States Patent [19]

Robinson

[11] Patent Number: 4,751,525
[45] Date of Patent: Jun. 14, 1988

[54] SCANNING SYSTEM AND METHOD OF SCANNING

[75] Inventor: Laurence J. Robinson, Herts, England

[73] Assignee: De La Rue Company, PLC, England

[21] Appl. No.: 860,018

[22] Filed: May 6, 1986

[30] Foreign Application Priority Data

May 7, 1985 [GB] United Kingdom ............... 8511531
Jun. 18, 1985 [GB] United Kingdom ............... 8515404

[51] Int. Cl.$^4$ ........................ G01D 9/42; H04N 1/21
[52] U.S. Cl. ............................ 346/108; 358/296; 355/26
[58] Field of Search ............ 346/1.1, 76 L, 107 R, 346/108, 109; 358/296; 355/23, 26

[56] References Cited

U.S. PATENT DOCUMENTS

| | | | |
|---|---|---|---|
| 3,254,579 | 6/1966 | Higonnet | 354/6 |
| 3,707,723 | 12/1972 | Levene | 346/108 |
| 3,974,506 | 8/1976 | Starkweather | 346/109 |
| 4,037,231 | 7/1977 | Broyles | 346/108 |
| 4,066,341 | 1/1978 | Schubert | 350/285 |
| 4,212,018 | 7/1980 | Ohnishi et al. | 346/108 |
| 4,329,011 | 5/1982 | Mori et al. | 350/6.6 |
| 4,537,478 | 8/1985 | Richter | 355/26 |

FOREIGN PATENT DOCUMENTS 3232840 3/1983 Fed. Rep. of Germany .
2071858 9/1981 United Kingdom .

Primary Examiner—E. A. Goldberg
Assistant Examiner—Mark Reinhart
Attorney, Agent, or Firm—Ostrolenk, Faber, Gerb & Soffen

[57] ABSTRACT

A method and apparatus for exposing a pair of radiation sensitive surfaces to a beam of optical radiation is described. The apparatus comprises a support (20) for supporting the radiation sensitive surfaces which may be provided on opposite sides of an identification card. A laser (1) provides a laser beam which impinges on a pair of resonant scanners (10,11) which cause radiation impinging on their respective mirrors to be reflected onto opposite surfaces of the identification card. A control system (103) causes the mirrors of the scanners (10,11) to oscillate in quadrature. The laser beam passes through an A/O modulator (4) responsive to signals from the control system (103) to cause radiation to impinge alternately on one or the other of the scanners (10,11). The scanners (10,11) are arranged such that when the beam of radiation impinges on a scanner, the radiation is caused to impinge on and to scan across the respective surface of the identification card (19) supported by the support (20), in response to oscillation of the scanner.

19 Claims, 5 Drawing Sheets

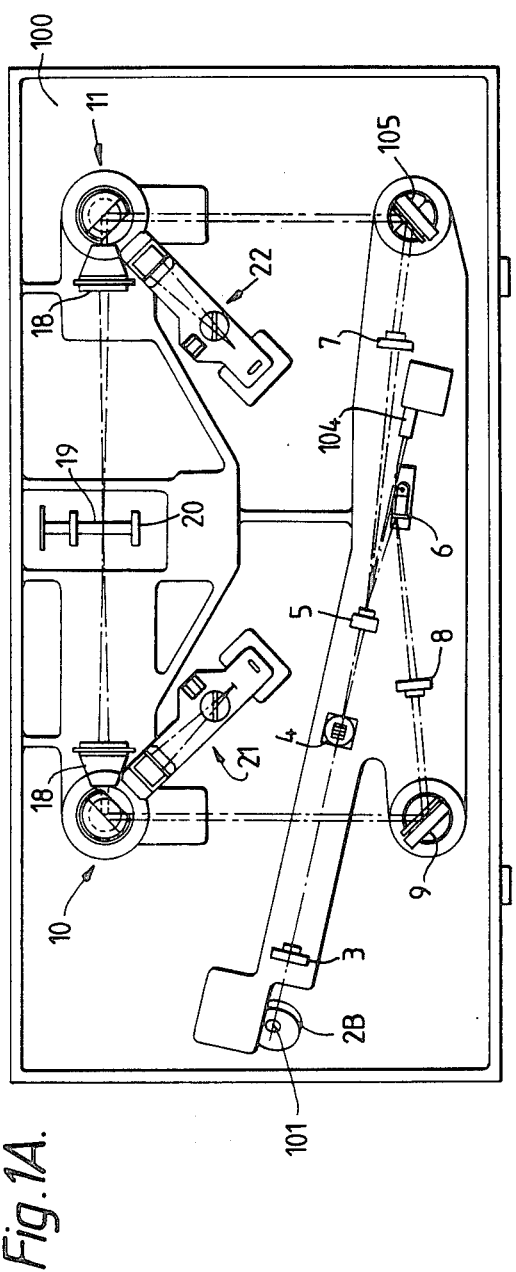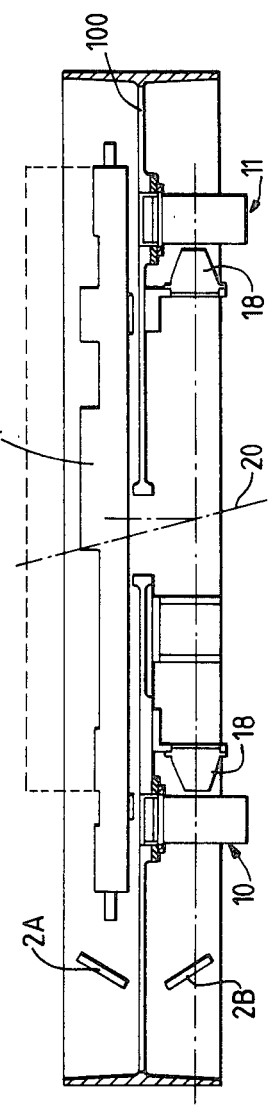
Fig. 1A.
Fig. 1B.

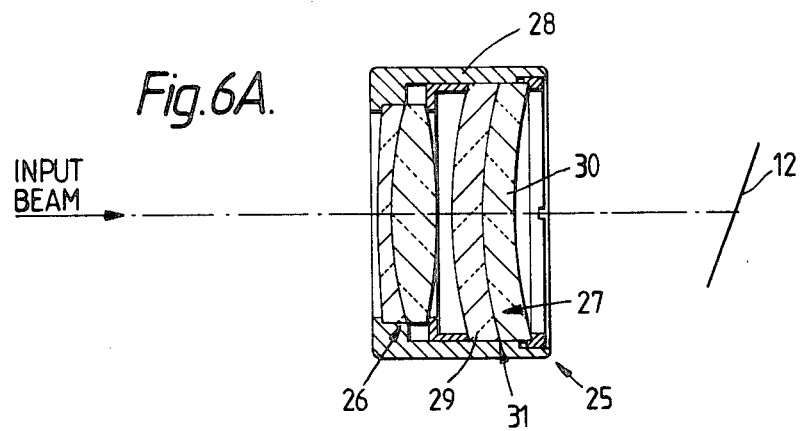
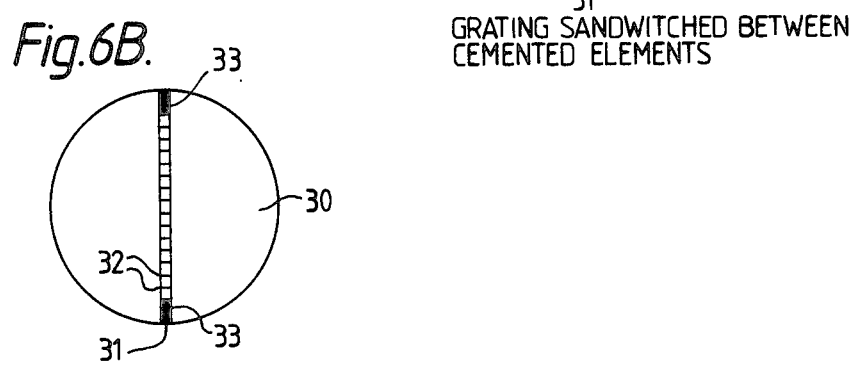
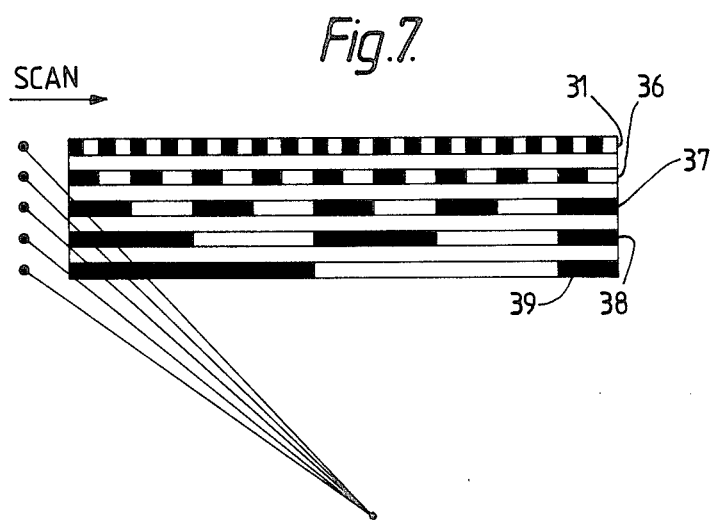

SCANNING SYSTEM AND METHOD OF SCANNING

FIELD OF THE INVENTION

The invention relates to methods and systems for exposing radiation sensitive means to beams of radiation. The invention is particularly concerned with printing systems, such as laser printing systems.

DESCRIPTION OF THE PRIOR ART

In systems and methods for exposing radiation sensitive means to a beam of radiation it is necessary to cause the beam of radiation to scan across the radiation sensitive means. Various proposals have been made in the past to achieve such scanning. One system makes use of a polygonal mirror which is rotated at a constant rate and onto which a beam of radiation impinges. Such a system is described in U.S. Pat. No. 4,212,018.

Polygons are the most commonly used scanner for non-impact printers. The greatest asset of such systems is the high line rate possible with a multi-facetted scanner rotating at a constant rate. Commercially available polygons have typical facet to facet pyramidal errors of greater than 3" (i.e. wobble). Assuming a perfect air bearing drive for the polygon, such an error will give a pixel placement error of $$3 \times 10^{-5} f$$

where f is the focal length of the scanning lens in a typical preobjective scanner. This error is not satisfactory for accurate printing. Various methods for correcting for this wobble have been proposed. For example, the wobble can be corrected by using an anamorphic lens system whereby the polygon facets and image plane are conjugates. Such a system employs complex optics with toroidal components.

Another system makes use of galvanometer scanners which have low wobble (typically 1"). Unfortunately, these galvanometer scanners have slow scanning rates in the order of 10's of hertz.

SUMMARY OF THE INVENTION

In accordance with one aspect of the present invention, a method of exposing radiation sensitive means to a beam of radiation comprises causing a pair of pivoted radiation guides to oscillate with a predetermined phase relationship; and causing a beam of radiation to impinge alternately on one or the other of the radiation guides, the radiation guides being arranged such that impinging radiation is caused to impinge on and scan across the radiation sensitive means in response to oscillation of the guides.

In accordance with a second aspect of the present invention, an exposing system comprises a support for supporting radiation sensitive means; a radiation beam source; a pair of radiation guide assemblies each having a radiation guide and control means for oscillating the guide, the control means being controlled in use to cause the radiation guides to oscillate with a predetermined phase relationship; a control system; and directing means responsive to signals from the control system to cause radiation from the radiation beam source to impinge alternately on one or the other of the radiation guides, the radiation guides being arranged such that when the beam of radiation impinges on a radiation guide, the radiation is caused to impinge on and scan across radiation sensitive means supported by the support, in response to oscillation of the guide.

I have recognised that the use of a radiation guide which oscillates provides a possible solution to the problems outlined above. Preferably, the radiation guides oscillate at resonant frequencies. This results in very low wobble (<0.5" arc) The frequencies of the guides may be multiples of each other but are conveniently the same. In the most general case, the frequencies may have a cyclic phase relationship whose period may or may not be infinite (ie. the phase relationship may be constant or sinusoidally varying).

Preferably, however, the guides oscillate in quadrature. The use of a single oscillating radiation guide still results in a proportion of "dead" time when the beam of radiation is not usefully traversing the radiation sensitive means. This "dead" time is minimised by causing the pair of radiation guides to oscillate in quadrature. This means that as the beam is scanned across the radiation sensitive means by one radiation guide, the other radiation guide is reversing its oscillating direction. The timing is such that the reversing step is completed at substantially the same time at which the other radiation guide has caused the beam of radiation to scan across the radiation sensitive means. Preferably, therefore, the oscillation rate of each radiation guide is such that the time for a guide to reverse direction is less than or equal to the time for the other radiation guide to cause the beam or radiation to scan across the radiation sensitive means.

In general, however, where the scanned field is not identical for both guides and even where the scanned field is not continuous, the switching between the two guides could occur at any time during the scan cycle and may occur many times per cycle.

Conveniently, the radiation guides oscillate in a sinusoidal manner. Such an oscillation is achieved by conventional resonant scanners which comprise a mirror mounted on a flexible mount which is oscillated under the control of torsion means such as one or more leaf springs. These scanners have a high Q (of the order of 400) and a very low wobble scan. The scan, though non-linear, is highly repeatable.

Preferably, the method further comprises causing relative movement between the radiation sensitive means and the beams of radiation from the radiation guides whereby the beams of radiation are caused to scan along respective sets of successive, different scan lines of the radiation sensitive means.

In the case where the radiation sensitive means and the beams of radiation from the radiation guides move relatively to one another, the successive scan lines will result in a zig-zag scan form. In general this will not be detectable but in some cases the system may further comprise an auxiliary deflector positioned between the directing means and the radiation guide assemblies; and an auxiliary deflector control for driving the auxiliary deflector in a substantially sawtooth fashion whereby the resulting scan comprise a set of parallel lines. The auxiliary deflector may comprise a mirror mounted on a piezo-electric support or a vibrating prism the deflector causing movement of the beam in a direction perpendicular to the scan direction so as to correct for the non-parallelism of the scan lines during the active scan time.

Preferably, different areas of the radiation sensitive means are exposed to the radiation beam from each of the radiation guides. This considerably reduces the time required to expose the radiation sensitive means and in a particularly convenient arrangement, the radiation guides are arranged to cause opposite sides of the radiation sensitive means to be exposed. This has particular application in the printing of information on each side of a document such as an identification (ID) card having a radiation sensitive layer on each side.

Preferably, the beam of radiation comprises optical radiation. Conveniently, the radiation beam source comprises a laser.

It is particularly convenient if the beam of radiation is modulated in response to control information relating to characters, images and the like which it is desired should be recorded on the radiation sensitive means. Typically, the radiation beam will be controlled in an on-off fashion in response to the control information.

Conveniently, the directing means includes a beam modulator, such as an A/O modulator, and modulator control means for causing the modulator to diffract the impinging beam of radiation alternately in first and second directions whereby the beam is fed towards the corresponding radiation guide.

The directing means may further include a prism onto which the beam of radiation is incident. In the example just described, in which the directing means also includes a modulator, the modulator may be arranged to cause the beam of radiation to impinge on different faces of the prism. In other arrangements in which a modulator is not used, a prism may be moved between first and second positions in which the beam of radiation is incident on different faces of the prism and is reflected towards corresponding radiation guides, or a mirror may be used which is rotated between two angular positions.

Conveniently, where the beam is modulated in response to control information, this modulation is carried out by a common beam modulator which also causes the radiation to impinge alternately on one or the other of the radiation guides.

The control system will typically comprise a computer.

It should be understood that the invention is particularly applicable to laser writing systems.

In several examples, it is important to monitor the positions of the radiation guides. Preferably, each radiation guide comprises a rotatable reflective surface, the apparatus further comprising for each radiation guide an auxiliary source of radiation; a set of reflecting surfaces facing the rotatable reflective surface in use and spaced apart along an arc whose centre of curvature is substantially at the centre of rotation of the rotatable, reflective surface in use, focusing means and radiation detection means, the focusing means being positioned such that radiation from the source impinges on the focussing means and is focussed onto the arc via the rotatable reflective surface, and being such that radiation reflected from one of the reflecting surfaces and reflected from the rotatable reflective surface is focussed by the focussing means onto a substantially fixed position coupled with the detection means.

By providing the set of reflecting surfaces along the focal plane of the focussing means no additional collimating systems are required and only a simple detector is needed since radiation from the set of reflecting surfaces will always be focussed at the same position.

Although the arrangement as defined above senses movement of each rotatable, reflective surface, it is particularly preferable if the apparatus further comprises, for each radiation guide, means for generating a plurality of auxiliary radiation beams; and one or more additional sets of reflecting surfaces having a similar form to the one set of reflecting surfaces, the number of sets of reflecting surfaces being the same as the number of auxiliary beams of radiation, and a characteristic of each set of reflecting surfaces differing from the other sets of reflecting surfaces whereby in use the radiation detection means detects at least some of the radiation beams at each of a plurality of positions of the rotatable reflective surface such that the position of the rotatable, reflective surface can be monitored.

For simplicity the or each auxiliary source of radiation may be separate from the one source used to impinge on the radiation sensitive means. However, in some cases, a common source may be used together with suitable beam splitters.

The characteristic of the sets of reflecting surfaces may comprise the width of each reflecting surface in the arc direction so that for example a binary output unique to each predetermined position of the rotatable, reflective surface is obtained.

Conveniently, the detection means comprises an array of detectors onto each of which a respective beam of radiation is focussed.

Preferably, the or each set of reflecting surfaces comprises a plurality of reflecting strips extending transversely to the arc direction. Conveniently, the set or sets of surfaces is sandwiched between a pair of protective members, at least the protective member facing the rotatable reflective surface in use being substantially transparent to the radiation. The use of this "doublet" arrangement protects the set of surfaces and ensures that no dirt or dust can lie in the focal plane and thus produce noise.

Typically, the or each set of reflective surfaces may be provided by chrome strips positioned on a glass substrate.

The auxiliary beam could be offset from the reflective surfaces as it passes from the auxiliary source to the rotatable reflective surface.

It is particularly convenient, however, if the focussing means is substantially co-axial with the or each set of surfaces, the arrangement being such that radiation which has been reflected from the or each set of surfaces onto the rotatable, reflective surface is then reflected through the focussing means and is focussed onto the detection means.

This provides a particularly compact unit which does not interfere with the main purpose for which the rotatable, reflective surface is provided or make use of the main source of radiation the full power of which may be used, for example, in a writing process.

To maximise signal strength, the focussing means should cause the size of the focussed spot on the reflective surfaces to be substantially the same as or smaller than the minimum dimension of each reflective surface.

Each rotatable, reflective surface may be provided by an oscillatable plane mirror. It is believed that the invention is also applicable to sensing movement of curved reflective surfaces.

Preferably, the source of radiation comprises a laser diode.

BRIEF DESCRIPTION OF THE DRAWINGS

An example of a laser writing system and method in accordance with the present invention will now be described with reference to the accompanying drawings, in which:

FIG. 1A is a schematic side elevation, and FIG. 1B is a schematic, partial plan of the apparatus;

FIG. 6A illustrates the mounting of a grating in more detail, and FIG. 6B illustrates the grating schematically; and, FIG. 7 is an enlarged cross-section through part of a modified form of grating.

DETAILED DESCRIPTION OF AN EMBODIMENT

Figure 2:
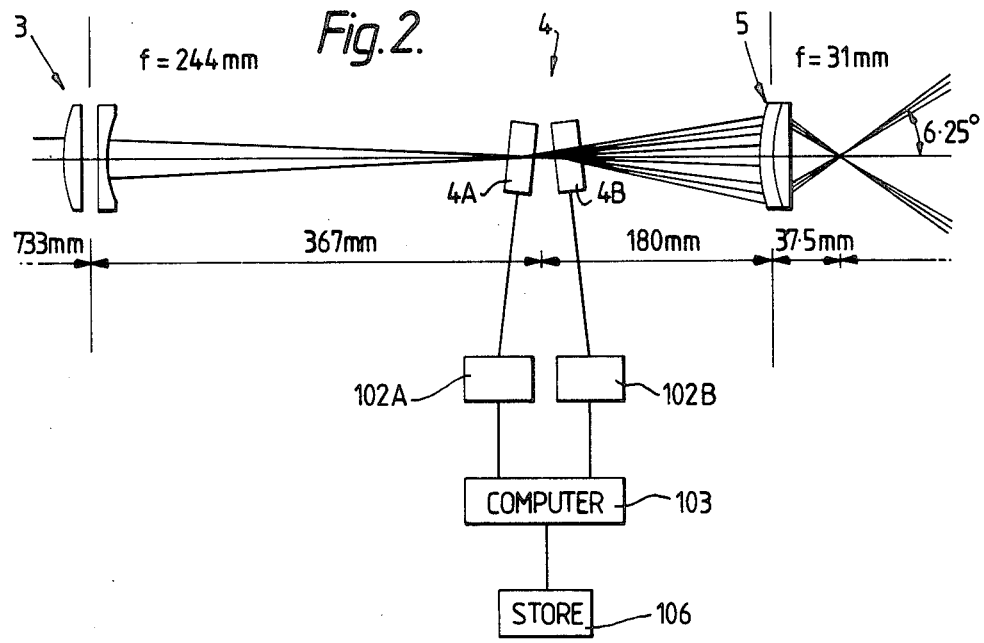
FIG. 2 illustrates part of the optics in more detail.

The system comprises an 18 watt YAG laser 1 which may be operated in a continuous wave mode or a pulsed wave mode. A suitable laser is manufactured by Quantronix. This laser is mounted on one side of a central support plate 100 and generates an optical, coherent beam of radiation which is reflected by a mirror 2A through an aperture 101 in the plate 100 onto a mirror 2B and then onto a converging lens 3. The lens 3 focusses the radiation onto an acousto-optic (A/O) modulator 4. Radiation from the modulator 4 passes through an expanding lens 5 and, depending on how the modulator is controlled, a diffracted portion is reflected by a mirror 6, or directly impinges on a collimating lens 7.

This part of the optics is shown in more detail FIG. 2. The A/O modulator 4 comprises two lead molybdate crystals 4A, 4B arranged at an acute angle to each other (determined empirically for maximum efficiency) and positioned along the beam path. Each crystal is controlled by a respective RF driver 102A, 102B which itself is connected to a controlling computer 103.

When a respective drives 102A, 102B is actuated, the impinging beam is diffracted by an 80 MHz acoustic wave at 1.3° from the zero order direction.

The zero order beam passes through the lens 5 to a beam dump 104.

The crystals 4A, 4B are controlled separately so that only one diffracts the incoming beam at any instant. When crystal 4A is active, the first order beam impinges on the mirror 6 while when crystal 4B is active, the first order beam impinges on the lens 7.

The beam reflected by the mirror 6 impinges on a collimating lens 8 and is then reflected by a mirror 9 onto a resonant scanner 10. The beam from the lens 7 is reflected by a mirror 105 onto a resonant scanner 11.

Figure 3:
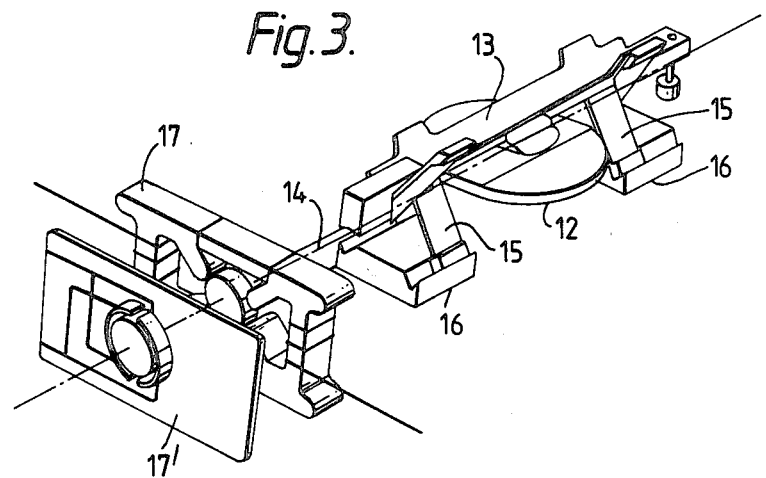
FIG. 3 illustrates a resonant scanner in more detail.

The resonant scanners 10 and 11 are identical and so only the scanner 10 will be described in detail. This is illustrated in more detail in FIG. 3. The scanner 10 comprises a mirror 12 mounted on a support 13 non-rotatably connected to a rod 14. The support 13 is suspended by leaf springs 15 on a base 16. This form of mounting allows the support 13 to oscillate in a sinusoidal manner at a frequency of between 100 and 5000 Hz, for example about 250 Hz. This frequency is determined by the resonant frequency of the assembly. Oscillation is initiated and maintained from time to time by driving the metal rod 14 via a magnetic driver 17. A synchronisation sensor 17' ensures that the scanner is locked to its own drive signal. A suitable resonant scanner is the model ISX manufactured by General Scanning.

The beam of radiation is reflected by the mirror 12 onto a lens 18 and from there onto a record medium such as an identification card 19 supported in a support 20 (omitted in FIG. 1B). The card 19 has a radiation sensitive layer on each of its main surfaces. This layer may be constituted by a radiation sensitive coating such as a silver halide dichromated gelatin, a photoresist, or a very thin metal coating as described in more detail in our copending British Applications Nos. 8521363 and 8521364. Since the mirror 12 oscillates, the radiation beam will be scanned in a vertical direction across the card 19. In order that the beam of radiation scans the complete card, the support 20 is movable in a conventional manner (by means not shown) in a direction transverse to the beam of radiation and to the scanning direction of the beam of radiation (i.e. horizontally).

A similar lens 18 is positioned adjacent the scanner 11.

In operation, the two resonant scanners 10, 11 are controlled electronically to oscillate in quadrature. In practice, one scanner acts as a master while the second is driven from a signal representing the velocity of the master but with a 90° phase delay. Furthermore, only the central, approximately linear part of the motion of each scanner is used by suitably controlling activation of the crystals 4A,4B. This results in a mode of operation summarised in the table below.

TABLE

| Beam Switched To | Scanner 10 | Scanner 11 |
| --- | --- | --- |
| Scanner 10 | Writing (top to bottom) | Reversing at top extremity. |
| Scanner 11 | Reversing at bottom extremity | Writing (top to bottom) |
| Scanner 10 | Writing (bottom to top) | Reversing at bottom extremity |
| Scanner 11 | Reversing at top extremity | Writing (bottom to top) |

Figure 4:
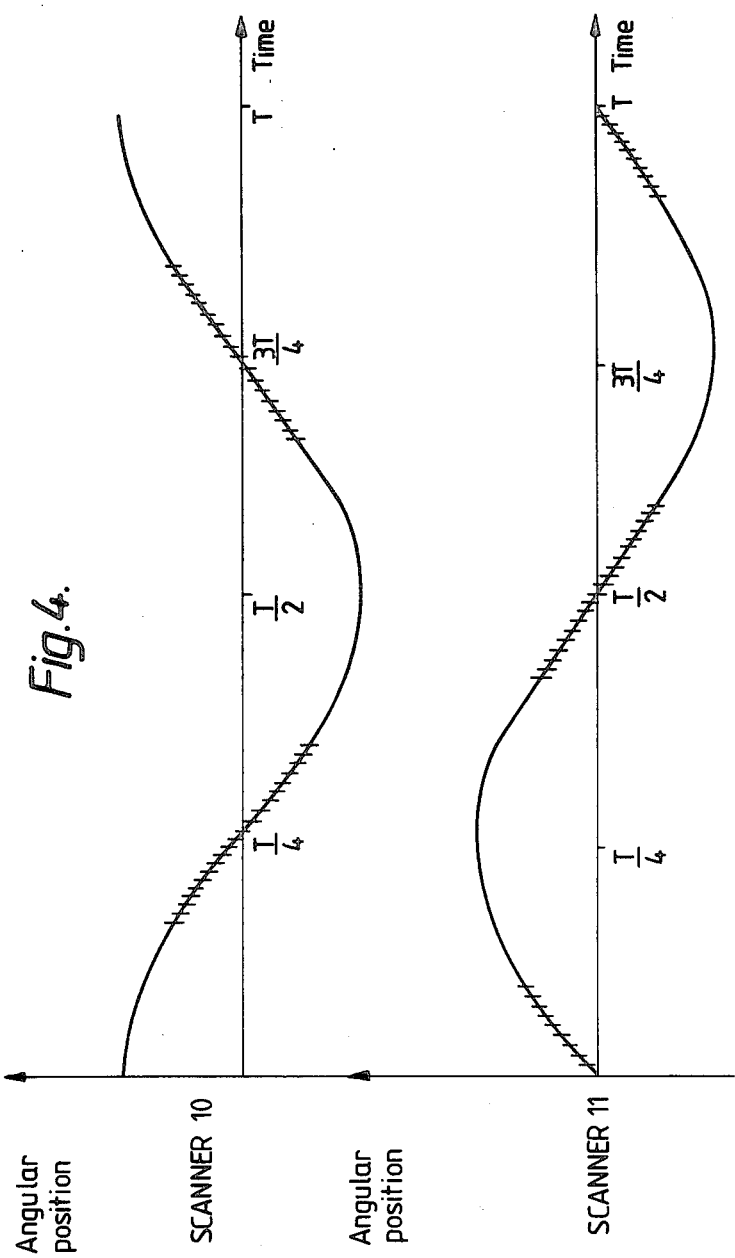
FIG. 4 is a timing diagram for the scanners shown in FIG. 1.
Figure 5:
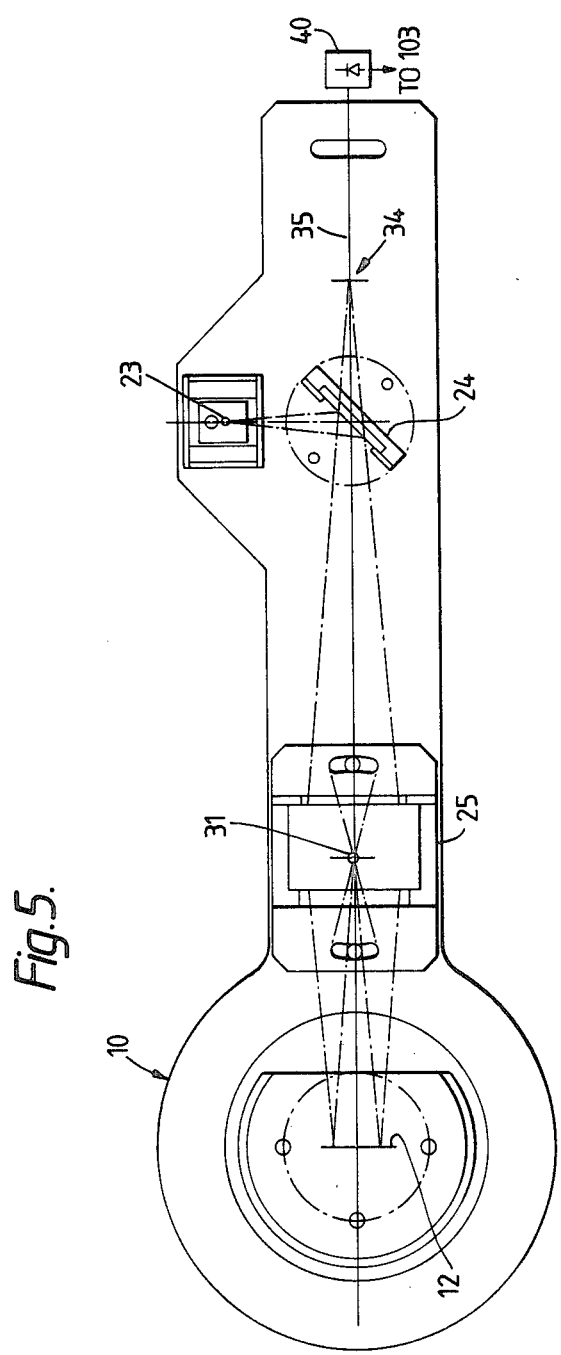
FIG. 5 is an enlarged side view of the position detector.

This is illustrated graphically in FIG. 4 with the hatched portions of the curves indicating active writing time and T representing the oscillation period.

This mode of operation enables almost 100 percent utilisation of the beam of radiation. The system also enables both sides of the card 19 to be written simultaneously.

The beam of radiation is also modulated in accordance with data representing images such as characters, photo images, signatures and the like via the A/O modulator 4 in a conventional manner under the control of the computer 103 which accesses data pixel by pixel in the appropriate order from a store 106.

Data applied to the A/O modulator 4 from the store 106 to turn the beam on and off pixel by pixel must be timed in such a way that the resulting image is correctly positioned on the card 19. Since the beam movement is non-linear (FIG. 4), some means of generating timing signals related to beam movement is required. This is achieved by providing for each resonant scanner 10, 11, a graticule encoder 21, 22.

The graticule encoder 21, which is identical to the encoder 22, will now be described in more detail.

The encoder 21 includes a laser diode 23 which generates a laser beam which is reflected from a 50/50 beam splitter 24 onto a lens system 25. The lens system 25 (FIG. 6A) comprises two segmented doublets 26,27 of convex and concave lenses mounted in a housing 28. The lenses 29,30 of the doublet 27 have their abutting surfaces concentric with the centre of rotation of the scanner mirror 12.

The abutting surface of the lens 30 carries a grating 31 of chrome strips facing the mirror 12 (FIG. 6B). A plurality of strips 32 of chrome are provided at equally spaced intervals across the surface of the lens 30. Areas of solid chrome 33 are provided at either side of the grating 31. The grating 31 is manufactured from a 100 line pairs/mm master (i.e. 100 chrome strips/mm) with each strip having a width in the order of 4.5 μm which is photographically copied onto the glass substrate.

The grating 31 has the same arcuate form as the surface of the lens 30 and is positioned along an arc corresponding to the focal plane of the lens system 25 and having a centre of curvature coincident with the centre of rotation of the mirror 12. Thus, as the scan mirror 12 rotates, the focussed beam from the diode 23 and reflected by the mirror 12 scans the grating 31 without any defocussing and since the laser beam always impinges normally on the plane containing the chrome strips 32, it will be retro-reflected off successive chrome strips onto the scan mirror 12 and then back through the lens system 25. The lens system 25 will cause this reflected beam to be focussed onto a position 34 after passing through the splitter 24. It should be noted that the position 34 is stationary in space. It is therefore possible to position one end of an optical fibre 35 at the position 34, the other end of the fibre being connected to a detector, such as a diode detector 40, to sense the reflected beam. The detector is connected to the computer 103.

The encoder 21 is arranged so that the spot size of the beam from the diode 23 is comparable with the width of a chrome strip to obtain good contrast.

As the scan mirror 12 rotates through one oscillatory movement, the beam focussed onto the grating 31 will alternately impinge on successive chrome strips 33 and the intermediate transparent spaces. If the beam impinges on a space, there will be no reflection and so no beam will be sensed by the diode detector. Thus, the diode detector will sense the beam at generally regularly spaced intervals and generate a pulse or clock output signal having a frequency proportional to the scan mirror velocity. This pulse signal will have a period corresponding to an angular change of the scan mirror 1 of d/2R radians where d is the grating spacing and R is the radius of curvature of the surface on which the chrome strips 33 are provided (e.g. 98.27 mm). This clock signal is then used to access pixel data from the store 106.

It should be noted that the grating 31 has a width of about 2 mm and thus occupies only a small fraction of the aperture of the lens system 25 which is of the order of 35 mm diameter. It thus has a negligible effect on the imaged spot. It should also be noted that since the chrome strips 33 are sandwiched between the lenses 29, 30 no dirt or dust can lie in the focal plane and thus produce noise.

In one particular example, the optical path length between the laser diode 23 and the lens system 25 is 180 mm while the optical path length between the grating 31 and the scan mirror 12 is 90 mm.

Typically, the beam from the laser diode 23 will impinge on the scan mirror 12 in the same area as the main writing beam.

The reason for providing the solid chrome areas 33 is to provide to the processing electronics a start of scan signal. This will correspond with a long duration signal impinging on the diode detector.

As previously mentioned the graticule encoder 22 is indentical to the encoder 21 and is also linked with the computer 103.

FIG. 7 illustrates in enlarged, diagrammatic form, a modified grating assembly. In this case, a number N of gratings (four of which 36–39 are shown) are provided in series in addition to the grating 31. In addition, N sources of radiation (not shown) generate N beams each of which passes through the lens system 25 and the set of gratings to impinge on the scan mirror 12. The beams are reflected by the scan mirror 12, as before, onto the set of gratings and then are back reflected to respective diode detectors (not shown) coupled by fibre optic to respective spaced positions corresponding to position 34.

It will be seen in FIG. 7 that each grating 31,36–39 has reflecting strips (indicated by the dark sections) half the width in the scan direction of the reflecting strips in the next grating. This means that discrete positions of the scan mirror 1 can be coded in a binary form corresponding to whether or not light is received at each diode detector.

The system as so far described writes alternately downwards and upwards on the front of the card 19, and likewise on the back. Since the card 19 is at the same time moving horizontally, the resulting track on the card is of a zig-zag form. In general, with writing densities of the order of 960 lines/inch, the slant angle is small enough to be ignored but this can be compensated for by incorporating an auxiliary reflector, typically a mirror on a piezo-electric mounting, downstream of the A/O modulator 4. This is not shown in FIG. 1A. The auxiliary reflector is driven in a programmed approximately saw-tooth fashion by the computer 103 so as to compensate for the motion of the card 19 during the writing of each scan line. The resultant written track on the card thus becomes vertical and all lines, during the active scan time, are parallel.

I claim:

1. A method of exposing radiation sensitive means to a beam of radiation, the method comprising causing first and second pivoted radiation guides to oscillate with a predetermined phase relationship; and causing a single beam of radiation to impinge alternately on said first and said second radiation guides, whereby said radiation guides cause said impinging radiation to impinge on and scan across said radiation sensitive means in response to oscillation of said radiation guides.

2. A method according to claim 1, wherein said radiation guides oscillate in quadrature.

3. A method according to claim 2, wherein the oscillation rate of each of said radiation guides is such that the time for a guide to reverse direction is not greater than the time for the other radiation guide to cause said beam of radiation to scan across said radiation sensitive means.

4. A method according to claim 1, wherein said radiation guides oscillate in a sinusoidal manner.

5. A method according to claim 1, further comprising causing relative movement between said radiation sensitive means and said beams of radiation from said radiation guides whereby said beams of radiation from said radiation guides are caused to scan along respective sets of successive, different scan lines of said radiation sensitive means.

6. A method according to claim 1, wherein said radiation guides are arranged to cause opposite sides of said radiation sensitive means to be exposed.

7. A method according to claim 1, wherein said beam of radiation comprises optical radiation.

8. A method according to claim 1, wherein said beam of radiation is modulated in response to control information relating to at least one of the group comprising characters and images which it is desired should be recorded on said radiation sensitive means.

9. An exposing system comprising a support for supporting radiation sensitive means; a radiation beam source; a pair of radiation guide assemblies having first and second radiation guides respectively and control means for oscillating said guides, said control means being controlled in use to cause said radiation guides to oscillate with a predetermined phase relationship; a control system; and directing means responsive to signals from said control system to cause a single radiation beam from said radiation beam source to impinge alternately on said first and said second radiation guides, whereby when said beam of radiation impinges on a radiation guide, said radiation is caused to impinge on and scan across radiation sensitive means supported by said support, in response to oscillation of said guide.

10. A system according to claim 9, wherein said directing means includes a beam modulator, and modulator control means for causing said modulator to diffract said impinging beam of radiation alternately in first and second directions whereby said beam is fed towards said corresponding radiation guide.

11. A system according to claim 9, wherein said control system is adapted to control said beam modulator also to modulate said beam in response to control information relating to at least one of the group comprising characters and images which it is desired should be recorded on said radiation sensitive means.

12. A system according to claim 9, wherein each radiation guide comprises a rotatable reflective surface, said apparatus further comprising, for each said radiation guide, an auxiliary source of radiation, a member defining a set of reflecting surfaces facing said rotatable reflective surface and spaced apart along an arc whose centre of curvature is substantially at the center of rotation of said rotatable, reflective surface, focussing means, and radiation detection means, said focussing means being positioned such that radiation from said source impinges on said focussing means and is focussed onto said arc via said rotatable reflective surface, and such that radiation reflected from one of said reflecting surfaces and reflected from said rotatable reflective surface is focussed by said focussing means onto a substantially fixed position coupled with said detection means.

13. A system according to claim 12, further comprising, for each radiation guide, means for generating a plurality of auxiliary radiation beams; and at least one additional member defining a respective set of reflecting surfaces having a similar form to said one set of reflecting surfaces, the number of said sets of reflecting surfaces being the same as the number of said auxiliary beams of radiation, and a characteristic of each set of reflecting surfaces differing from the other sets of reflecting surfaces whereby said radiation detection means is adapted to detect at least some of said radiation beams at each of a plurality of positions of said rotatable reflective surface such that the position of said rotatable, reflective surface can be monitored.

14. A system according to claim 13, wherein said characteristic of said sets of reflecting surfaces comprises the width of each reflecting surface in the arc direction.

15. A system according to claim 12, wherein said at least one set of reflecting surfaces is defined by a plurality of reflecting strips extending transversely to the arc direction.

16. A system according to claim 12, wherein said at least one set of surfaces is sandwiched between a pair of protective members, at least said protective member facing said rotatable reflective surface being substantially transparent to said radiation.

17. A system according to claim 12, wherein said at least one set of reflective surfaces is defined by chrome strips positioned on a glass substrate.

18. A system according to claim 12, wherein said focussing means is substantially co-axial with said at least one set of surfaces, whereby radiation which has been reflected from said surfaces onto said rotatable, reflective surface is then reflected through said focussing means and is focussed onto said detection means.

19. A laser beam recording system including apparatus according to claim 9, wherein said radiation beam source comprises a laser.

* * * * *